Aug. 29, 1950     D. S. GREY     2,520,635
OPTICAL SYSTEM

Filed March 10, 1949     2 Sheets-Sheet 1

| ELEMENT | RADIUS | THICKNESS | MATERIAL |
|---|---|---|---|
| I | $R_1$ = 3.85 | $d_1$ = 6.0 | FUSED QUARTZ |
|   | $R_2(L)$ & $R_2(M)$ = 4.25 | $t_1$ = 1.530 |  |
| II | $R_3$ = 17.35 | $d_2$ = 14.066 | FUSED QUARTZ |
|   | $R_4(M)$ & $R_4(L)$ = 21.50 | $t_2$ = 2.995 |  |
|   |   | $d_3$ = 150.0 |  |

| ELEMENT | RADIUS | THICKNESS | MATERIAL |
|---|---|---|---|
| III | $R_5$ = 3.232 | $d_4$ = 5.080 | FUSED QUARTZ |
|   | $R_6(L)$ & $R_6(M)$ = 3.547 | $t_3$ = 1.25 |  |
| IV | $R_7$ = 16.356 | $d_5$ = 13.625 | FUSED QUARTZ |
|   | $R_8(L)$ & $R_8(M)$ = 20.502 | $t_4$ = 3.125 |  |
|   |   | $d_6$ = 115. |  |

INVENTOR
David S. Grey
BY Donald L. Brown
and Monsure B. Berg
Attorneys

| ELEMENT | RADIUS | THICKNESS | MATERIAL |
|---|---|---|---|
| V | $R_9 = \infty$ | $t_5 = 3.26$ | CALCIUM FLUORIDE |
| | $R_{10} = 3.614$ | $d_8 = 1.05$ | |
| VI | $R_{11} = 3.285$ | $t_6 = 3.075$ | CALCIUM FLUORIDE |
| | $R_{12}(L) \& R_{12}(M) = 4.270$ | $d_9 = 14.1$ | |
| VII | $R_{13} = 17.334$ | $t_7 = 3.0$ | FUSED QUARTZ |
| | $R_{14}(M) \& R_{14}(L) = 21.614$ | $d_{10} = 120.00$ | |

Patented Aug. 29, 1950

2,520,635

UNITED STATES PATENT OFFICE 2,520,635

OPTICAL SYSTEM

David S. Grey, Weston, Mass., assignor to Polaroid Corporation, Cambridge, Mass., a corporation of Delaware Application March 10, 1949, Serial No. 80,614

9 Claims. (Cl. 88—57)

This invention relates to optical systems and more particularly has reference to systems useful in the fields of microscopy, photography and projection.

Objects of the invention are to provide improved quality and range of achromatization in optical systems for use in microscope objectives, photographic objectives, projection objectives and the like, which designs employ a comparatively few component parts without resorting to aspheric surfaces, and particularly to the provision of objectives of the character noted which are well corrected throughout a region of the electromagnetic spectrum ranging from the medium ultraviolet into the infrared and which comprise a plurality of optically aligned refractive elements which have reflecting surfaces in the form of reflection coatings over certain portions of said elements; as well as to provide objectives of this nature which are substantially free of astigmatism and which are corrected for spherical aberration and coma for differences in index of refraction caused by changes in refractive index of the order of 0.10 in accordance with variation of the wavelength of light throughout said wavelength range while maintaining the position of conjugate foci substantially constant.

These and other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

In my copending application Serial No. 55,588, filed October 20, 1948, for Optical Systems, I have described an objective making use of a concave mirror element and a convex mirror element which are optically aligned with each other in spaced-apart relation and which are also optically aligned with a plurality of refractive elements (dioptric components). The two mirror elements (catoptric components) are arranged so that their reflecting surfaces are opposed to each other and the refractive elements are positioned between the convex mirror and the short conjugate focus of the objective with the convex mirror element mounted on that refractive surface most distant from the short conjugate focus. In the objective described in the previously mentioned application the convex mirror element is formed of glass having a convex surface which is coated with a suitable reflection coating and the element is secured to the refractive surface just mentioned as by cementing it thereto. All of the refractive elements are formed of materials which transmit light in the ultraviolet region of the spectrum.

As intimated, the present invention intends to provide an optical system which fulfills the functions of the objective disclosed in my earlier filed application, with a design which is of much simpler construction. In this regard the present invention provides means making use of only two refractive elements which have portions thereof coated with a reflection coating or film to provide a system wherein each element thereof is a combined refracting and reflecting component.

Figure 1:
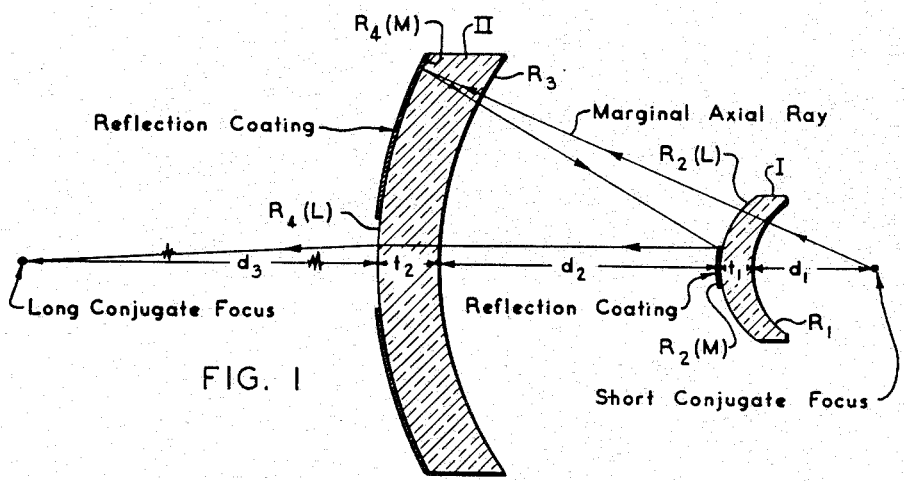
Figure 1 is a sectional view of an objective lens system embodying one form of the invention and especially adapted for microscopy.

With reference to the drawings, Fig. 1 illustrates one embodiment of the invention showing an objective lens system comprising an element I of the refractive-reflecting type described and optically aligned therewith and element II also of the refractive-reflecting type. Elements I and II are menisci. As may be noted, use is made of a small central spot on the convex surface of element I which serves as a reflecting component. This spot is formed of any conventional reflection coating and in effect provides the convex surface with a small circularly shaped area at its center which is of a reflecting character and a broad ring which extends outwardly from the periphery of the central area to the edge of the surface and which is of a refractive character. It will be apparent that light proceeding from the short conjugate focus which enters the element I and which is incident on the reflection coating will not be transmitted through the element since the reflection coating is opaque. On the other hand, light proceeding from the long conjugate focus and incident on the reflection coating of the element I will not enter the element at all but will be reflected towards the element II. Hence, the reflection coating on the element I is in effect a convex mirror.

A reflection coating similar to that described is provided on the convex surface of the element II. However, in this instance the reflection coating forms a broad ring on the convex surface of the element II and leaves a centrally located refracting portion on this surface. Light transmitted from the short conjugate focus through the element I and into the element II will be incident on the reflection coating provided on the convex surface of this element. Light incident on the reflection coating of the element II will not be transmitted therethrough but will be reflected and redirected onto the mirror provided by the reflection coating on the element I. It may thus be observed that the reflection coating provided on the convex surface of the element II is in effect a concave mirror. Likewise it may be noted that light proceeding from the long conjugate focus of the objective of Fig. 1 and incident on the reflection coating of element II will not be transmitted through the element, whereas light incident on the uncoated central portion of refractive portion of the convex surface of element II will be transmitted through and directed onto the reflection coating provided on the element I.

These light-directing and transmitting properties of the objective are made possible by locating the reflecting coatings on the back surfaces of elements I and II, the front surface of the objective being treated as that surface nearest the short conjugate focus, and such properties will become apparent by tracing the path direction of a marginal axial ray traversing the objective when it is employed with a microscope. Such a marginal axial ray is shown in the full lines with arrows thereon in Fig. 1 as proceeding from the short conjugate focus, at which the object is located for microscope observation, through the uncoated portion of the element I, where it is refracted twice and thence proceeds through the concave surface of the element II where it is again refracted to the convex surface of this element, where it undergoes reflection from the concave mirror provided by the reflection coating on element II, and again passes through the concave refracting surface of the element II while undergoing refraction and is directed onto the convex shaped reflection coating on the convex surface of the element I to undergo a second reflection which directs it through the refracting central portion of the element II, where it undergoes two further refractions, and is directed to the long conjugate focus.

The elements I and II are formed of optical media which are capable of transmitting ultraviolet radiation, visible light, and near infrared radiation. Examples of materials of this character are calcium fluoride, lithium fluoride, fused quartz, sodium chloride, potassium bromide, β-magnesium oxide, potassium chloride and the like. Of these materials, fused quartz and substantially pure or artificially grown crystals of calcium fluoride may be named as preferred. Materials of the character just noted are capable of transmitting light throughout a wavelength range of from below 2200 A. to beyond 6000 A., the wavelength range for which the objective is corrected.

The reflection coatings for the elements I and II of the objective are preferably formed of aluminum. Other materials may be employed, such as, for example, silver and the like, to provide reflection coatings.

With regard to the notations used throughout the drawings and in the various tables referring to lens data, it is pointed out that each reflection coating has a thickness dimension so minute that it may be neglected and consequently may be treated as having a radius of curvature equal to that of the uncoated portion of the surface on which the coating is deposited. Since the radius of curvature of a refracting-reflecting surface is treated as constant over its entire area, the same numerical subscript after the term "R" is used for the radius for the coated portion and for the radius of the uncoated portion of the refracting-reflecting surface, but in one instance the R with subscript is followed by (L) to indicate the portion of the surface which is refracting and in the other instance the R with the subscript is followed by (M) to indicate the portion of the surface which is reflecting.

Table 1 below gives the construction data with dimensions in millimeters for the specific example of the objective illustrated in Fig. 1.

*Table 1*

|  | Radius | Thickness | Material |
| --- | --- | --- | --- |
| Element I | $R_1$= 3.85 | $d_1$=6.0 | Fused Quartz. |
|  | $R_2(L)$&$R_2(M)$= 4.25 | $t_1$=1.530 |  |
|  |  | $d_2$=14.066 |  |
| Element II | $R_3$=17.35 | $t_2$=2.995 | Do. |
|  | $R_4(M)$&$R_4(L)$=21.50 | $d_3$=150.0 |  |

Table 1a below gives representative ultraviolet indices of the preferred materials. These indices were computed by least square curve fitting from values in the International Critical Table.

*Table 1a.—Refractive index (n)*

| Wavelength | Calcium fluoride | Fused quartz |
| --- | --- | --- |
| 2200 Å | 1.4811 | 1.52861 |
| 2400 Å | 1.47123 | 1.51347 |
| 2700 Å | 1.46093 | 1.49811 |
| 3200 Å | 1.45057 | 1.48282 |
| 4000 Å | 1.44187 | 1.47022 |

The objective illustrated in Fig. 1 is computed specifically for use as a microscope objective and therefore allows for a cover slide of quartz 0.2 mm. in thickness. The magnification between the short and long conjugate foci is 68½×. The objective of Fig. 1 has a numerical aperture of about 0.5 and a focal length of 2.5 mm. The optical medium for each element of the objective disclosed in Fig. 1 is fused quartz.

Figure 2:
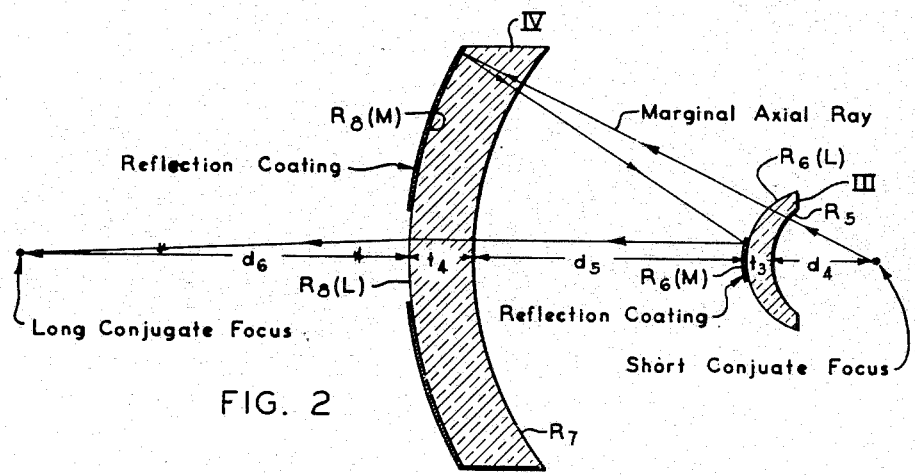
Fig. 2 is a sectional view of an objective lens system embodying another form of the invention and also adapted for microscopy.

Another embodiment of the invention is disclosed in Fig. 2 and likewise comprises an objective having two elements indicated by the reference characters III and IV respectively. Both elements are concave and convex elements similar to those disclosed in connection with Fig. 1.

Table 2, set forth below, gives the constructional data for the objective disclosed in Fig. 2.

*Table 2*

|  | Radius | Thickness | Material |
| --- | --- | --- | --- |
| Element III | $R_5$= 3.232 | $d_4$= 5.080 | Fused Quartz. |
|  | $R_6(L)$&$R_6(M)$= 3.547 | $t_3$=1.25 |  |
|  |  | $d_5$=13.625 |  |
| Element IV | $R_7$=16.356 | $t_4$= 3.125 | Do. |
|  | $R_8(M)$&$R_8(L)$=20.502 | $d_6$=115. |  |

The objective illustrated in Fig. 2 is computed specifically for use as a microscope objective and therefore allows for a cover slide of quartz 0.2 mm. in thickness. The magnification between the short and long conjugate foci is 67×. The objective of Fig. 2 has a numerical aperture of 0.5 and a focal length of 2.0 mm. The path of a marginal axial ray is traced through the objective of Fig. 2.

Figure 3:
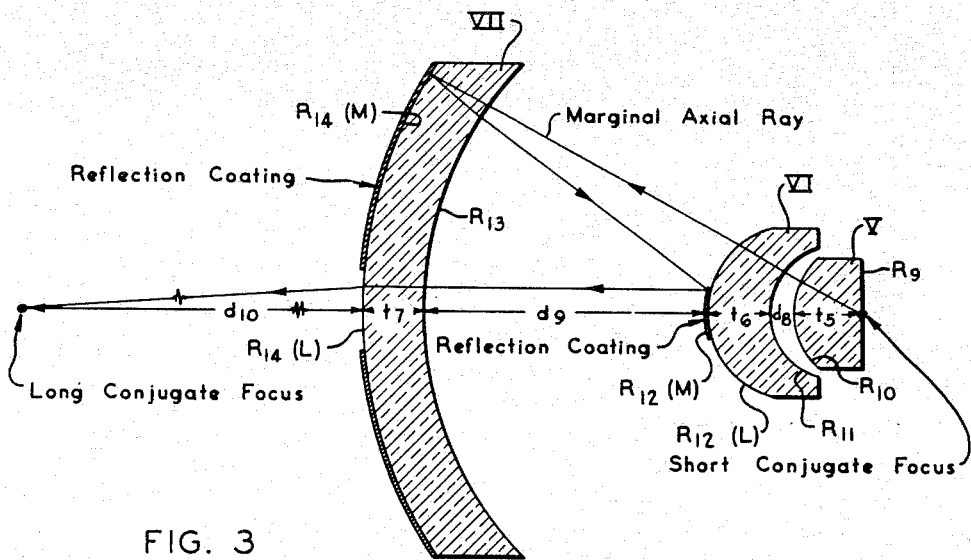
Fig. 3 is a sectional view of still another embodiment of the invention and shows an immersion objective for use in microscopy.

A further embodiment of the invention is disclosed in Fig. 3. This embodiment makes use of three elements indicated respectively by the reference characters V, VI and VII. Elements VI and VII are meniscus elements similar to those of the objectives disclosed in Figs. 2 and 3. On the other hand the objective of Fig. 3 is an immersion type objective and is, therefore, provided with a hemisphere which is formed by the element V. Two different optical media are employed in the objective of Fig. 3, elements V and VI being formed of calcium fluoride and element VII being formed of fused quartz. Reflection coatings are located on the convex surface of elements VI and VII in a manner similar to that already described in connection with the objectives in Figs. 1 and 2.

The constructional data for the objective of Fig. 3 is set forth in Table 3 immediately following.

Table 3

|  | Radius | Thickness | Material |
| --- | --- | --- | --- |
| Element V | $R_9 = \infty$ | $t_5 = 3.26$ | Calcium Fluoride. |
|  | $R_{10} = 3.614$ | $d_8 = 1.05$ |  |
| Element VI | $R_{11} = 3.285$ | $t_6 = 3.075$ | Do. |
|  | $R_{12}(L) \& R_{12}(M) = 4.270$ | $d_9 = 14.1$ |  |
| Element VII | $R_{13} = 17.334$ | $t_7 = 3.0$ | Fused Quartz. |
|  | $R_{14}(M) \& R_{14}(L) = 21.614$ | $d_{10} = 120.0$ |  |

The magnification between the long and the short conjugate foci of the objective shown in Fig. 3 is 90×. This objective has a numerical aperture of 0.75 and a focal length of 1.56 mm. The path of a marginal axial ray is traced through the objective of Fig. 3.

It has been stated previously that the function of the optical system of this invention is to provide an objective of large numerical aperture corrected over a wavelength region considerably broader than the visible spectrum. The design for a small central spot on a lens surface as the convex mirror in a system possessing the above characteristics would be simple to calculate if the range of index and dispersion differences available in this extended wavelength interval were as great as those available in the visible spectrum. If the refracting surface which supports the convex mirror in the objective of my heretofore referred to application is made continuous with said convex mirror, a large amount of chromatic aberration is introduced at this surface. The large range of index and dispersion values of available optical glasses would readily permit removal of this chromatic aberration at one or two other refractive surfaces in the system. The comparatively small dispersion differences available in ultraviolet materials suitable for use in a microscope objective do not permit removal of this chromatic aberration by use of components located physically between the convex mirror and the short conjugate focus unless very steep curvatures are employed. These steep curvatures do not permit large numerical apertures. The efficacy of a surface of given curvature in effecting longitudinal chromatic aberration is among other things proportional to the square of the paraxial incident height at the surface. This relationship explains why it is difficult to remove the chromatic aberration introduced at the surface which bears a mirror by components between that surface and the short conjugate focus because the paraxial incident height decreases rapidly as one approaches the focus.

This just mentioned relationship also indicates that the chromatic aberration introduced by the surface which bears the convex mirror may easily be corrected by a refracting surface situated between the convex mirror and the concave mirror. An objection to the simple insertion of a lens between the concave and convex mirrors is that light must pass through this lens three times in passage between the conjugate foci. Consequently six air-glass surfaces would be introduced into the optical system simply to provide correction for chromatic aberration.

The present invention uses one surface of this lens to form the concave mirror. Thereby correction for chromatic aberration is achieved by the addition of only two passages through a refracting surface. Reference to Fig. 1 shows that the light passing from the short conjugate focus to the convex mirror is refracted twice by this lens component. The refraction which occurs at this component in passage from the convex mirror to the long conjugate focus must occur in any reflection objective which is sealed against dust. Consequently these two refractions cannot be attributed to introduction of the lens between the convex and concave mirrors.

The range of parameters which permits elimination of aberrations for this type of objective is as follows:

The physical separation between the convex and concave mirror surfaces, disclosed in the various embodiments of the present invention, is so selected that these surfaces are spaced apart by a distance selected to provide a paraxial incident height on the concave reflecting surface carried by the element most distant from the short conjugate focus, which is at least three times greater than the paraxial incident height on the convex reflecting surface carried by the convex surface of the meniscus element located closest to the short conjugate focus.

For an axial point, rays should pass the surface nearest the concave mirror at nearly normal incidence in passage between the concave and convex mirrors, (i. e., the wave front should be nearly concentric with the surface). The radius of curvature of the concave mirror is nearly equal to the radius of curvature of the corresponding element in the objective of my previously mentioned application, but tends to be slightly shorter. In Fig. 1 it is evident that if separations are determined and the radius of the concave and convex mirrors is determined, a unique relationship exists between the radius of curvature of the refracting surface nearest the concave mirror and the refracting surface nearest the short conjugate focus to provide correction of longitudinal chromatic aberration. The obscuring ratio is primarily determined by the ratio of the physical separation between the reflecting surfaces to the focal length of the objective. The larger this ratio the smaller is the obscuring ratio. As the obscuring ratio is made small, the thickness of the element which bears the convex mirror may be increased in order to permit simultaneous correction of spherical aberration and coma.

Figs. 1 and 2 show two embodiments of this invention which have obscuring ratios of 11½% and 9½% respectively. My copending application teaches the use of a refracting surface of large under-corrected spherical aberration situated near the short conjugate focus in order to obtain correction of zonal spherical aberration at a large numerical aperture. The present invention does not possess this feature and has a numerical aperture limited to about 0.5. The prior art has at times employed objectives making use of only two spherical mirrors, which objectives have a small numerical aperture. The advantages of the system of the present invention over the use of only two spherical mirrors without refractive components are not, therefore, in regard to increased numerical aperture but in regard to obscuring ratio. Two mirrors used at this numerical aperture without refractive elements would have an obscuring ratio of 20% without consideration of opaque members which support the convex mirror. The useful numerical aperture of the systems illustrated in Figs. 1 and 2 may be increased by insertion of a refractive component with a center of curvature at the short conjugate focus. For such a system the useful numerical aperture is $n$ times 0.5 where $n$ is the refractive index of said lens.

Fig. 3 shows incorporation of such an element into this lens system. The radius of curvature of the outer surface departs slightly from the distance from that surface to the focus. Better correction of astigmatism is thereby achieved.

The objectives in Figs. 1 and 2 contain only one optical medium, fused quartz. It is obvious that the general principles involved in computing such a lens do not depend on the index of the material used. These objectives could, therefore, readily be adapted to use of a different optical material or to any portion of the spectrum where one optical medium and reflecting surfaces are available.

With regard to the system with the hemisphere, the correction of aberrations could have been obtained as well by using one material throughout. Two materials were used, quartz for the surfaces bearing the concave mirror, and fluoride was used elsewhere because its absorption coefficient is less than that of the quartz in the ultraviolet. Quartz was used for the concave mirror because its surface is harder and more easily figured accurately.

Objectives in Figs. 1 and 2 have been computed for use with a quartz slide cover 0.2 mm. thick.

The objective in Fig. 3 has been computed as though the object were imbedded in the first lens medium. Depending upon the specific use to which this objective is put, one should allow for a layer of immersion liquid between the object and the first lens or for a layer of immersion liquid and a slide cover. At the numerical aperture of this objective, it would be desirable to allow for the chromatic aberration introduced by the difference in index and dispersion between the first lens and the immersion liquid and slide cover, if any. Suitable materials for use as immersion liquid are water, a water glycerine mixture or cyclohexane. The small change in chromatic aberration caused by immersion liquid and slide cover may be compensated for in accordance with the teaching above for control of chromatic aberration.

Available materials for immersion liquid and slide cover have a higher dispersion than the material used for the first lens, i. e., calcium fluoride. Accordingly, when the chromatic aberration introduced by the immersion liquid and cover slide is compensated, a small amount of secondary spectrum is introduced. The secondary spectrum of the objective in Fig. 3 is slightly anomalous in sign to allow for the secondary spectrum which will appear when the chromatic aberration of the slide cover and immersion liquid is corrected. The residual secondary spectrum of the design in Fig. 3 is equal to the depth of focus at numerical aperture 0.75. Thereore, it is suitable for use without immersion liquid and slide cover or may easily be adapted to any reasonable value of thickness of immersion liquid and slide cover.

The refractive surfaces in the objectives illustrated herein are adapted to correct the mirror surfaces employed in these systems. It is desirable that the refractive components not only compensate the aberrations of mirror surfaces at one wavelength of incident radiation but that a useful system should be provided which possesses stability of correction over a large wavelength interval. I have found that the refractive components for a system may be so arranged that the correction is stable for changes in index of about 0.1. As previously stated it is possible to sufficiently reduce the change in aberration with wavelength by use of only one refractive material. Since correction is possible with only one optical medium, the design may be adapted to any wavelength of the electromagnetic spectrum in which there is a transparent optical medium of refractive index greater than 1.0. The objective systems illustrated are corrected for the visible spectrum and large portions of the infrared and ultraviolet spectra simultaneously.

While the objectives of this invention have been specifically disclosed by way of illustration for use as microscope objectives with the light traversing these optical systems in the direction from the short conjugate focus to the long conjugate focus, direction of the light path may be reversed for other applications such as a photographic objective. For use as a photographic objective and for a projection objective, the correction for cover slide thickness might be altered and in particular it might be changed to zero. For these other uses it might be desired to alter the long conjugate focal distance for which the objective is corrected by suitably bending the components, as will be well understood to the art. A method of great convenience in altering the long conjugate focal distance for which the objective is corrected has been found to consist merely of a minute change in the spacing between the convex and concave reflecting surfaces. The spherical aberration may, by this means, be adjusted over a large range of magnifications. The coma correction remains essentially complete.

The diameter of the centrally located reflection coating, as well as the width of the ring-shaped reflection coating, are dependent, as will be well understood by the art, upon the optical media and curvatures employed to make the most efficient use of the systems illustrated.

While the thickness of the reflection coatings have been treated as negligible throughout this disclosure, it will be understood that they have been greatly enlarged in the drawings for the purpose of clearly illustrating the invention.

It is well known to the art that the spherical aberration of a microscope objective is proportional to its focal length. The numerical apertures of the objectives herein described are limited by spherical aberration. It is, therefore, evident that these objectives constructed in a shorter focal length would be capable of numerical apertures moderately greater than 0.5.

Since certain changes may be made in the above product without departing from the scope of the invention herein involved, it is intended that all matter contained in the above description, or shown in the accompanying drawings, shall be interpreted as illustrative and not in a limiting sense.

What is claimed is:

1. In a lens system providing a microscope objective, a photographic objective, a projection objective and the like for use throughout a wavelength range extending from within the medium ultraviolet region of the spectrum to within the infrared region, a plurality of optically aligned refractive components, a mirror surface individually associated with one refractive face of one of said refractive components and a second mirror surface individually associated with one refractive face of a second of said refractive components, the first-mentioned refractive component which has a mirror surface associated therewith being located closer to the short conjugate focus of said objective than the second-mentioned refractive component which has a mirror surface associated therewith, the mirror surface associated with said first-mentioned refractive component being convex and being continuous over a small central portion of the refractive face of said first-mentioned refractive component which is furthest removed from said short conjugate focus whereby to obscure a small central portion thereof while leaving a continuous uncovered area in surrounding relation thereto, the mirror surface associated with the second-mentioned refractive component being concave and continuous with a portion of that refractive face of said second-mentioned refractive component which is furthest removed from the short conjugate focus of the objective to provide a ring-shaped area extending from the edge of said refractive face towards the center thereof whereby to provide a continuous uncovered centrally located portion on said refractive face, said mirror surfaces facing each other and said refractive elements being formed individually of material capable of transmitting light throughout said wavelength range and correcting said mirror surfaces for spherical aberration and coma for differences in index of refraction caused by changes in refractive index of the order of 0.10 in accordance with variation in the wavelength of light throughout said range while maintaining the position of the conjugate foci of the objective substantially constant for any said difference.

2. In a lens system providing a microscope objective, a photographic objective, a projection objective and the like for use throughout a wavelength range extending from within the medium ultraviolet region of the spectrum to within the infrared region, a plurality of optically aligned refractive elements, a mirror surface in optical contact with the refractive surface located most distant from the short conjugate focus of the objective of that refractive element located closest to said short conjugate focus, and a second mirror surface in optical contact with the refractive surface which is most distant from the short conjugate focus of that refractive element which is furthest removed from the short conjugate focus, said second mirror surface being of a ring-like shape and providing an uncovered centrally located portion on the refractive surface with which it is in contact, said first mirror surface covering a small central area on the refractive surface with which it is in contact and leaving a continuous uncovered portion in surrounding relation thereto, said mirror surfaces facing each other and said refractive elements being formed individually of material capable of transmitting light throughout said wavelength range and correcting said mirror surfaces for spherical aberration and coma for differences in index of refraction caused by changes in refractive index of the order of 0.10 in accordance with variation in the wavelength of light throughout said range while maintaining the position of the conjugate foci of the objective substantially constant for any said difference and, together with said mirror surfaces, providing an objective having a numerical aperture not exceeding an aperture of the order of 0.75.

3. In a lens system providing a microscope objective, a photographic objective, a projection objective and the like for use throughout a wavelength range extending from within the medium ultraviolet region of the spectrum to within the infrared region, a meniscus refractive element, a second meniscus refractive element in optical alignment therewith, said first refractive element being located the closer to the short conjugate focus of the objective and having its concave surface facing said short conjugate focus, said second refractive element also having its concave surface facing said short conjugate focus, a reflection coating deposited on the convex surface of said first refractive element and providing a first reflecting surface, and a reflection coating deposited on the convex surface of said second refractive element and providing a second reflecting surface, said second reflecting surface being of a ring-like shape and providing an uncovered centrally located portion on the convex surface of said second refractive element, said first reflecting surface covering a small central area on the convex surface of said first refractive element and leaving a continuous uncovered area in surrounding relation thereto, said refractive elements being formed individually of material capable of transmitting light throughout said wavelength range and correcting said reflecting surfaces for spherical aberration and coma for differences in index of refraction caused by changes in refractive index of the order of 0.10 in accordance with variation in the wave length of light throughout said range while maintaining the position of the conjugate foci of the objective substantially constant for any said difference and, together with said reflecting surfaces, providing an objective having a numerical aperture not exceeding an aperture of the order of 0.75.

4. An objective as defined in claim 3 wherein said refractive elements are formed of the same optical medium.

5. An objective as defined in claim 3 wherein said first and second reflecting surfaces are spaced apart by a distance selected to provide a paraxial incident height on the second reflecting surface which is at least three times greater than the paraxial incident height on the first reflecting surface.

6. An objective as defined in claim 3 wherein said first reflecting surface obscures not more than 11% of light incident on the refractive surface which carries said first reflecting surface.

7. An objective as defined in claim 3 wherein said refractive elements are each formed of the same optical medium, and wherein said first and second reflecting surfaces are spaced apart by a distance selected to provide a paraxial incident height on the second reflecting surface which is at least three times greater than the paraxial incident height on the first reflecting surface.

8. An objective as defined in claim 3 wherein a hemispherical element is optically aligned with said first refracting element on the side thereof facing the short conjugate focus.

9. An objective as defined in claim 3 wherein a hemispherical element is optically aligned with said first refractive element on the side thereof which faces said short conjugate focus, and wherein said hemispherical element has the plane surface thereof located substantially at said short conjugate focus.

DAVID S. GREY.

REFERENCES CITED

The following references are of record in the file of this patent:

UNITED STATES PATENTS

| Number | Name | Date |
| --- | --- | --- |
| 1,967,214 | Acht | July 24, 1934 |
| 2,141,884 | Sonnefeld | Dec. 27, 1938 |
| 2,198,014 | Ott | Apr. 23, 1940 |
| 2,403,660 | Hayward | July 9, 1946 |
| 2,413,286 | Buchele | Dec. 31, 1946 |

FOREIGN PATENTS

| Number | Country | Date |
| --- | --- | --- |
| 544,694 | Great Britain | Apr. 23, 1942 |